US007106424B2

(12) United States Patent
Meneely et al.

(10) Patent No.: US 7,106,424 B2
(45) Date of Patent: Sep. 12, 2006

(54) COMPACT LASER ALTIMETER SYSTEM

(75) Inventors: Clinton T. Meneely, Burnsville, MN (US); Mark D. Ray, Burnsville, MN (US); Gary E. Halama, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 472 days.

(21) Appl. No.: 10/386,334

(22) Filed: Mar. 11, 2003

(65) Prior Publication Data

US 2004/0179186 A1 Sep. 16, 2004

(51) Int. Cl.
*G01C 3/08* (2006.01)

(52) U.S. Cl. .................... 356/5.01; 356/4.05; 356/4.08
(58) Field of Classification Search ............... 356/4.04, 356/4.05, 4.08, 5.01, 11; 342/120
See application file for complete search history.

(56) References Cited

U.S. PATENT DOCUMENTS

| | | | | |
|---|---|---|---|---|
| 3,489,495 | A | * | 1/1970 | Blau et al. .................. 356/4.06 |
| 3,712,985 | A | * | 1/1973 | Swarner et al. ............. 250/216 |
| 3,766,380 | A | | 10/1973 | Menzies |
| 3,865,491 | A | * | 2/1975 | Hogan ................... 356/139.06 |
| 4,517,458 | A | | 5/1985 | Barringer et al. |
| 4,633,072 | A | * | 12/1986 | Sugiura et al. .......... 250/201.2 |
| 6,094,304 | A | * | 7/2000 | Wallace et al. ............. 359/425 |
| 6,972,834 | B1 | * | 12/2005 | Oka et al. .................. 356/3.01 |
| 2003/0043364 | A1 | * | 3/2003 | Jamieson et al. .......... 356/28.5 |

FOREIGN PATENT DOCUMENTS

EP 324 582 7/1989

OTHER PUBLICATIONS

International Preliminary Report on Patentability Chapter II from PCT/US2004/007410.*

(Continued)

*Primary Examiner*—Thomas H. Tarcza
*Assistant Examiner*—Isam Alsomiri
(74) *Attorney, Agent, or Firm*—Calfee, Halter & Griswold LLP; Peter M. Hernandez (57) ABSTRACT

A laser-based altimeter for use on-board an aircraft comprises: a first housing including a hollow cavity and an exit aperture, and a second housing including a hollow cavity and an entrance aperture. A laser source and a plurality of first optical elements are fixedly supported in a compact configuration within the hollow cavity of the first housing. The plurality of first optical elements directs laser beams generated by the laser source from a first optical path to a second optical path which exits the first housing through the exit aperture. At least one second optical element is configured within the hollow cavity of the second housing to form a telescope with a predetermined field of view. The telescope receives at the entrance aperture reflections of the pulsed laser beams from objects within the field of view thereof and focuses the received reflections substantially to a focal point. A light detector is included for receiving and converting the focused reflections into electrical signals representative thereof. The first and second housings are fixedly secured in alignment with respect to each other to permit the second optical path of the pulsed laser beams to be adjusted within the field of view of the telescope. A mirror apparatus is the only first optical element of the plurality that is fixedly adjustable for directing the second optical path within the field of view of the telescope, the mirror apparatus being lockable in place after final adjustment. The first and second housings may be part of a common housing.

23 Claims, 7 Drawing Sheets

OTHER PUBLICATIONS

International Search Report from PCT/US2004/007410.

"Overview of Microlaser Products", Poly-Scientific, Mar. 12, 2002; (pp. 1-2).

"Design and Performance of an Airborne Multikilohertz Photon-Counting, Microlaswer Altimeter", Degnon, et al., internet publication, (www.sigmaspace.com/www/projects/microaltimeter/microaltimeter_peper.pdf) (pp. 1-8).

"ADM Laser Altimeter", internet publication, (www.optech.on.ca/prodgpa.htm) (pp. 1-2).

"Laser Distance, Level and Speed Meter LD90-3", internet publication, (www.riegel.co.at./id90/e-id 90-3.htm) (pp. 1-5).

* cited by examiner

COMPACT LASER ALTIMETER SYSTEM

BACKGROUND OF THE INVENTION

The present invention is directed to avionic systems for measuring altitude and range of an aircraft in general, and more particularly, to a compact laser altimeter system for obtaining precision above ground level (AGL) measurements for the aircraft.

Today's military and commercial aircraft desire more precise measurements of aircraft position and position information. Ground based RADAR systems and Global Positioning Systems (GPS) allow for precise positioning of an aircraft in latitude and longitude desirable for air traffic control, aircraft separation, and navigation. However, precise AGL measurements are often difficult to achieve with such systems, especially for applications in which precise placement above ground is needed. New levels of precision for altitude or AGL measurements, on the order of +/−6 inches (15 cm), for example, are often required for flight profiles ranging from hover, to nap of the earth (NOE) flight, and autonomous landing. Current aircraft altimeter systems generally can not achieve these precise measurements.

Recently, laser-based altimeters have been proposed for use on-board aircraft. This laser altimeter technology presents a significant advancement over radar altimeters as the ground registered data contains a higher level of resolution due to the narrow beam of the laser. However, the laser altimeters do pose certain concerns when applied to aircraft, especially with regard to the volume of the instrument attributed to the large number of optical elements contained therein. Another concern is directed to the ruggedness of the instrument in an aircraft flight environment. The optical elements of the laser altimeter are generally mounted on an optical bench, adjusted to be precisely aligned with respect to each other and secured in place. But, because of the of the vibration, shock and wide temperature variation encountered in aircraft flight, the optical elements have a tendency to become misaligned over time and thus, require constant maintenance. In bi-static laser altimeter configurations, back scattering of laser beam transmissions into a telescope portion is an additional concern.

The present invention is intended to overcome the aforementioned concerns of current laser altimeters by providing a compact laser altimeter which improves upon size, ruggedness and maintenance of the instrument as will become more evident from the following description.

SUMMARY OF THE INVENTION

In accordance with one aspect of the present invention, a laser-based altimeter for use on-board an aircraft comprises: a first housing including a hollow cavity and an exit aperture; a laser source and a plurality of first optical elements fixedly supported in a compact configuration within the hollow cavity of the first housing, the laser source for generating pulsed laser beams over a first optical path, and the plurality of first optical elements for directing the laser beams from the first optical path to a second optical path which exits the first housing through the exit aperture thereof; a second housing including a hollow cavity and an entrance aperture; at least one second optical element configured within the hollow cavity of the second housing to form a telescope with a predetermined field of view, the telescope for receiving at the entrance aperture reflections of the pulsed laser beams from objects within the field of view thereof and focusing the received reflections substantially to a focal point; a light detector for receiving and converting the focused reflections into electrical signals representative thereof; the first and second housings fixedly secured in alignment with respect to each other to permit the second optical path of the pulsed laser beams to be adjusted within the field of view of the telescope; and wherein only one first optical element of the plurality being fixedly adjustable for directing the second optical path within the field of view of the telescope.

In accordance with another aspect of the present invention, mirror apparatus for use in a laser altimeter contained in a walled housing, the mirror apparatus fixedly adjustable for directing laser beams from the laser altimeter along a desired optical path, the mirror apparatus comprising: an outer cylindrical section rotatably disposed within a wall of the housing; an inner cylindrical section rotatably disposed within the outer section; a mirror element disposed on a surface of the inner section which extends from the outer section and housing wall, the mirror element for reflecting the laser beams at an adjustable angle of reflection; the inner and outer sections being configured with different rotation axes with respect to each other; the angle of reflection of the mirror element being adjustable to a desired angle of reflection by the rotation of at least one of the inner and outer sections about the respective rotation axis thereof, the desired angle of reflection being that which directs laser beams from the laser altimeter along the desired optical path; and the inner and outer sections being lockable in place at the desired angle of reflection.

In accordance with yet another aspect of the present invention, a laser-based altimeter for use on-board an aircraft comprises: a first housing including a hollow cavity and an exit aperture; a laser source and a plurality of first optical elements fixedly supported in a compact configuration within the hollow cavity of the first housing, the laser source for generating pulsed laser beams over a first optical path which exits the first housing through the exit aperture thereof, the plurality of first optical elements disposed along the first optical path; a second housing including a hollow cavity and an entrance aperture; at least one second optical element configured within the hollow cavity of the second housing to form a telescope with a predetermined field of view, the telescope for receiving at the entrance aperture reflections of the pulsed laser beams from objects within the field of view thereof and focusing the received reflections substantially to a focal point; a light detector being fixedly adjustable in position within the hollow cavity of the second housing to receive the focused reflections, the light detector for converting the received reflections into electrical signals representative thereof; and the first and second housings fixedly secured in alignment with respect to each other to permit the first optical path of laser beams to fall within the field of view of the telescope.

DETAILED DESCRIPTION OF THE INVENTION

Figure 1A:
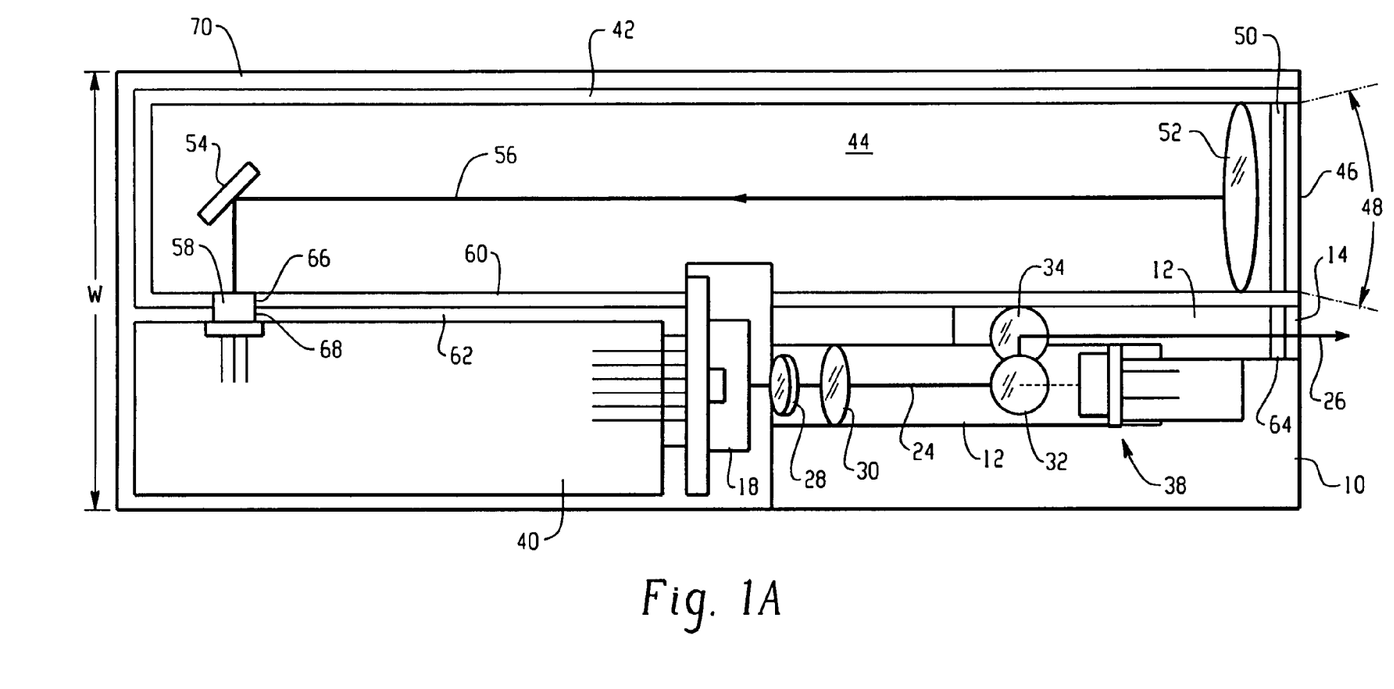
FIGS. 1A and 1B are cross-sectional top and side view illustrations, respectively, of a laser-based altimeter suitable for embodying the broad principles of the present invention.
Figure 1B:
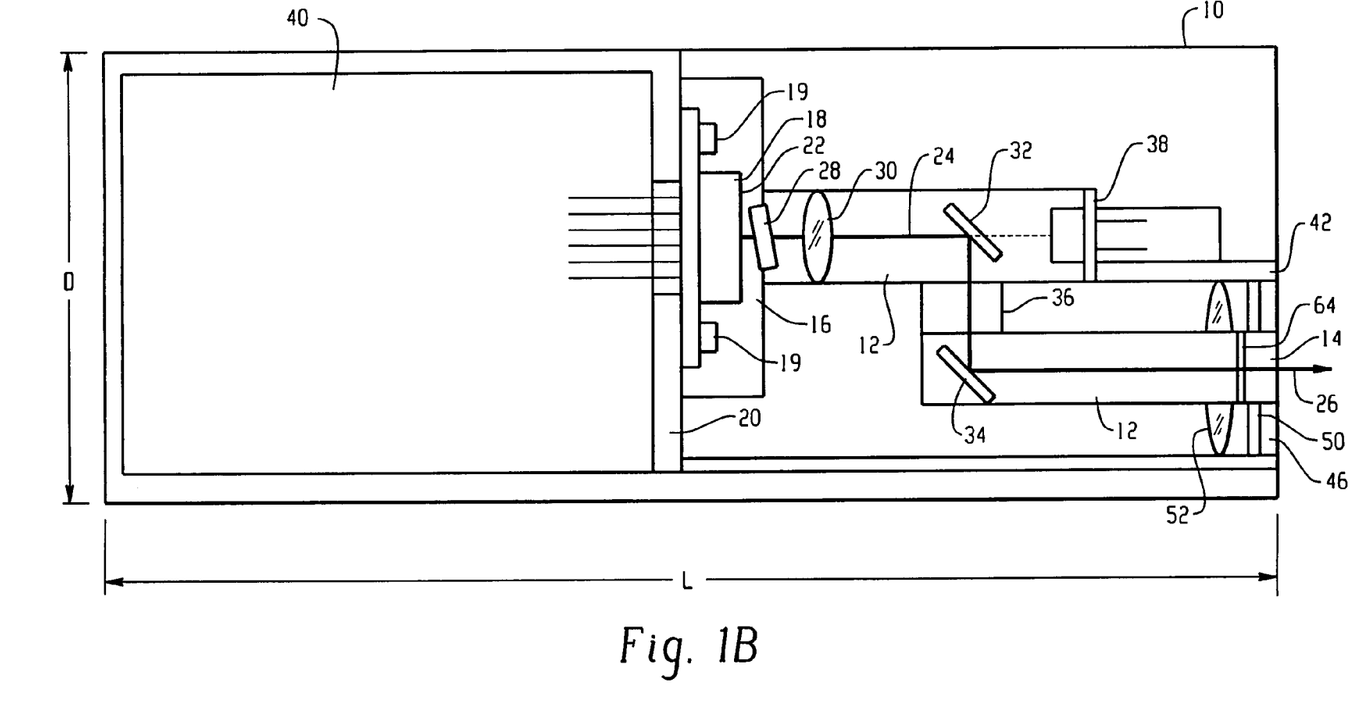

FIGS. 1A and 1B illustrate cross-sectional top and side views, respectively, of a laser-based altimeter suitable for embodying the broad principles of the present invention. Referring to FIGS. 1A and 1B, a laser transmitting or first housing 10 includes a hollow cavity 12 and an exit aperture 14. The opening of the cavity 12 and exit aperture 14 may be around ½ inch or 1.25 centimeters (cm) in diameter with an overall length of approximately 3 inches or 7.5 cm, for example. Disposed at an end 16, opposite the exit aperture 14, of the cavity 12 is a laser source 18 which may be a microlaser of the type manufactured by Poly-Scientific, bearing model number DEM 1064, for example. In the present embodiment, the microlaser 18 is a passively Q switched autonomously operated microchip laser pumped by a 950 micron diode to generate pulsed laser beams at a rate of approximately 8–10K pulses per second (pps) and a predetermined wavelength, which may be approximately 1064 nanometers (nm), for example. The microlaser 18 is contained in a TO-3 container or can which is fixedly secured to a wall 20 of the first housing 10 by bolts 19 via holes provided through a platform of the can 18. The TO-3 can also includes a windowed top surface 22 from which to emit the pulsed laser beams over a first optical path 24. It is understood that the specific pulse repetition rate and wavelength of the microlaser 18 are provided merely by way of example, and that other rates and wavelengths may be used just as well without deviating from the broad principles of the present invention. For example, for eye safe operation, a wavelength of approximately 1.5 microns may be chosen.

Fixedly supported in a compact configuration within the cavity 12 is a plurality of first optical elements for directing the laser beams from the first optical path 24 to a second optical path 26 which exits the first housing 10 through the exit aperture 14. The plurality of first optical elements comprises a band pass filter optical element 28 disposed in proximity to the windowed surface 22 of the microlaser 18 along the optical path 24. The optical element 28 may cover substantially the entire cavity opening at end 16 so as to block substantially the laser pump diode light and other wavelengths of light outside of a predetermined bandwidth around the predetermined wavelength of the laser beams from entering the cavity 12. To minimize optical feedback that may cause laser instabilities and to minimize the heat load on the laser chip, optical element 28 may be disposed at a slight angle to the optical path 24 so that the surface thereof does not reflect light directly back into the laser source 18. Another first optical element of the plurality may be a collimating lens 30 disposed along the first optical path 24 down stream of the filter element 28 for collimating and preventing further divergence of the laser beams along the path 24. Collimating lens 30 may be disposed along path 24 so as to match the laser beam divergence to a field of view of a telescope portion of the altimeter for improved efficiency as will become better understood from the description below. While the lens 30 and filter 28 are provided in the present embodiment, it is understood that due to the compactness of the overall configuration, one or both of the lens 30 and filter 28 may not be used in some applications.

To render the compact configuration of first optical elements, it is understood that the cavity 12 may take upon various shapes. In the present embodiment, the cavity 12 is shaped into a vertical "Z" with the elements 28 and 30 on a top level and the exit aperture 14 disposed at a bottom level. A vertical channel 36 of the cavity 12 connects the top and bottom levels. Two fold mirrors 32 and 34 are included in the plurality of first optical elements and disposed at the channel 36 to direct the first optical path from the top level to the bottom level. The fold mirror 32 is disposed at the top of the cavity channel 36 and the other fold mirror 34 is disposed at the bottom of the cavity channel 36. Accordingly, the combination of fold mirrors 32 and 34 direct the first optical path 24 to the second optical path 26 which exits the housing 10 at aperture 14. One of the fold mirrors 32 or 34 comprises mirror apparatus which is fixedly adjustable for directing the second optical path 26 along a desired optical path as will become more evident from the following description. Preferably, the top fold mirror 32 comprises the mirror apparatus, but it is understood that that either fold mirror 32 or 34 may be used for adjustment purposes.

Thus, in housing 10 all of the first optical elements are fixedly supported and not movable in the cavity 12, except for the adjustable mirror apparatus of either fold mirror 32 or 34, and even such mirror apparatus is lockable in place once properly adjusted. The top level of the cavity 12 may extend slightly beyond the vertical channel 36 for locating a light detector 38, which may be an avalanche photo-diode, for example. In this embodiment, the fold mirror 32 is configured to pass a small portion of the pulsed laser beams for detection by the light detector 38 which converts the detected laser pulses into electrical signals for use as start pulses. The housing 10 may include another cavity 40 for containing processing electronics for the laser altimeter which may be implemented on one or more printed circuit (PC) boards, for example. The light detector 38 may be coupled to the electronics in the cavity 40 for providing the start pulses for time-of-flight and ranging calculations thereby. Alternatively, a light detector diode may be embodied in the TO-3 can of the microlaser 18 for detecting and providing laser start pulses to the processing electronics via an electrical coupling thereto. It is understood that these techniques for generating trigger or start pulses are provided by way of example and that any method used will depend on available space and the particular optical system design.

A telescope or second housing 42 includes a hollow cavity 44 and an entrance aperture 46. At least one second optical element is fixedly disposed and configured within the cavity 44 to form a telescope with a predetermined field of view 48 which is preferably fixed. The telescope is operative to receive at the entrance aperture 46 reflections of the pulsed laser beams from objects within the field of view 48 thereof and focus the received reflections substantially to a focal point which may be within the cavity 44. The at least one second optical element may comprise a band pass filter optical element 50 disposed at the entrance aperture 46 for passing received wavelengths of light solely within a predetermined bandwidth around the predetermined wavelength of the pulsed laser beams. Thus, the filter optical element 50 minimizes background light interference from the outside environment from entering the cavity 44. In addition, the field of view 48 of the telescope may have to be minimized to further reduce interference from background solar radiation, for example. In some applications, a clear window may be disposed at aperture 46 to seal and protect the telescope from scratches and outside contamination; however, the filter optical element 50 could be mounted in such a way to serve the same purpose.

To form the telescope, the at least one second optical element comprises a convex or converging lens 52 disposed in proximity to the entrance aperture 46. In the present embodiment, the lens 52 is configured to have a predetermined focal length, which may be approximately 150 millimeters (mm), for example, for focusing the received reflections from the entrance aperture 46 to the focal point of the telescope which falls within the cavity 44. A fold mirror 54 may be fixedly disposed within the cavity 44 to direct the focused received reflections 56 to another light detector 58 which may also be an avalanche photo-diode, for example, disposed at the cavity 40. The light detector 58 may be also coupled to the processing electronics in cavity 40 for use in time-of-flight and ranging calculations thereby. Alternatively, the focused received reflections may be directed from the lens 52 directly to the light detector 58 which may be fixedly disposed in cavity 44, for example.

The first and second housings may be fixedly secured in alignment with respect to each other to permit the second optical path 26 of the pulsed laser beams to be adjusted within the field of view 48 of the telescope. Note that only one first optical element of the plurality is fixedly adjustable for directing the second optical path within the field of view 48 as will become better understood from the following description. In the present embodiment, the housings 42 and 10 are secured together along walls 60 and 62 of their respective cavities 44 and 40/12 to align the entrance and exit apertures respectively thereof in proximity to each other. It is preferable to have the apertures 14 and 46 as close as possible to each other. The exit aperture 14 may be offset slightly behind or in back of the entrance aperture 46 to avoid any backscattering of the transmitted laser beams directly into the entrance aperture 46 and cavity 44. In addition, a window pane 64 may be disposed at the exit aperture 14 for sealing the cavity 12 from the outside environment. Also, the window pane 64 should be tilted with respect to the plane of the exit aperture 14 to avoid reflections from the laser beams from traveling back down the transmitting optical path into the laser, possibly causing laser instabilities thereby. In addition, laser light may be reflected in the cavity 44 of telescope from the tilted window 64 as another technique for generating the start pulses as described herein above.

With the housings 42 and 10 fixedly secured together along the walls 60 and 62, aligned openings 66 and 68 may be provided in the walls 60 and 62 to permit access between cavities 44 and 40. In one embodiment, the light detector 58 is disposed within the aligned openings 66 and 68 so as to receive the focused reflections from the fold mirror 54 in cavity 44 and provide the converted electrical pulses to the processing electronics in the cavity 40.

Moreover, while the cavities 12, 40, and 44 are provided in separate housings 10 and 42, it is understood that such cavities may be machined, by milling, for example, from a common housing 70 in an alternate embodiment. Still further, the housings 10 and 42 may be sections of a common housing 70 in yet another embodiment. In any event, the common denominator for all such embodiments of the laser altimeter is to render the unit compact and rugged for use in an aircraft flight environment. The present embodiment as shown in FIGS. 1A and 11B provides for overall exemplary dimensions in length L, width W and depth D of approximately 7.5 inches or 19 cm, 2.5 inches or 6.25 cm, and 2.5 inches or 6.25 cm, respectively.

Figure 2:
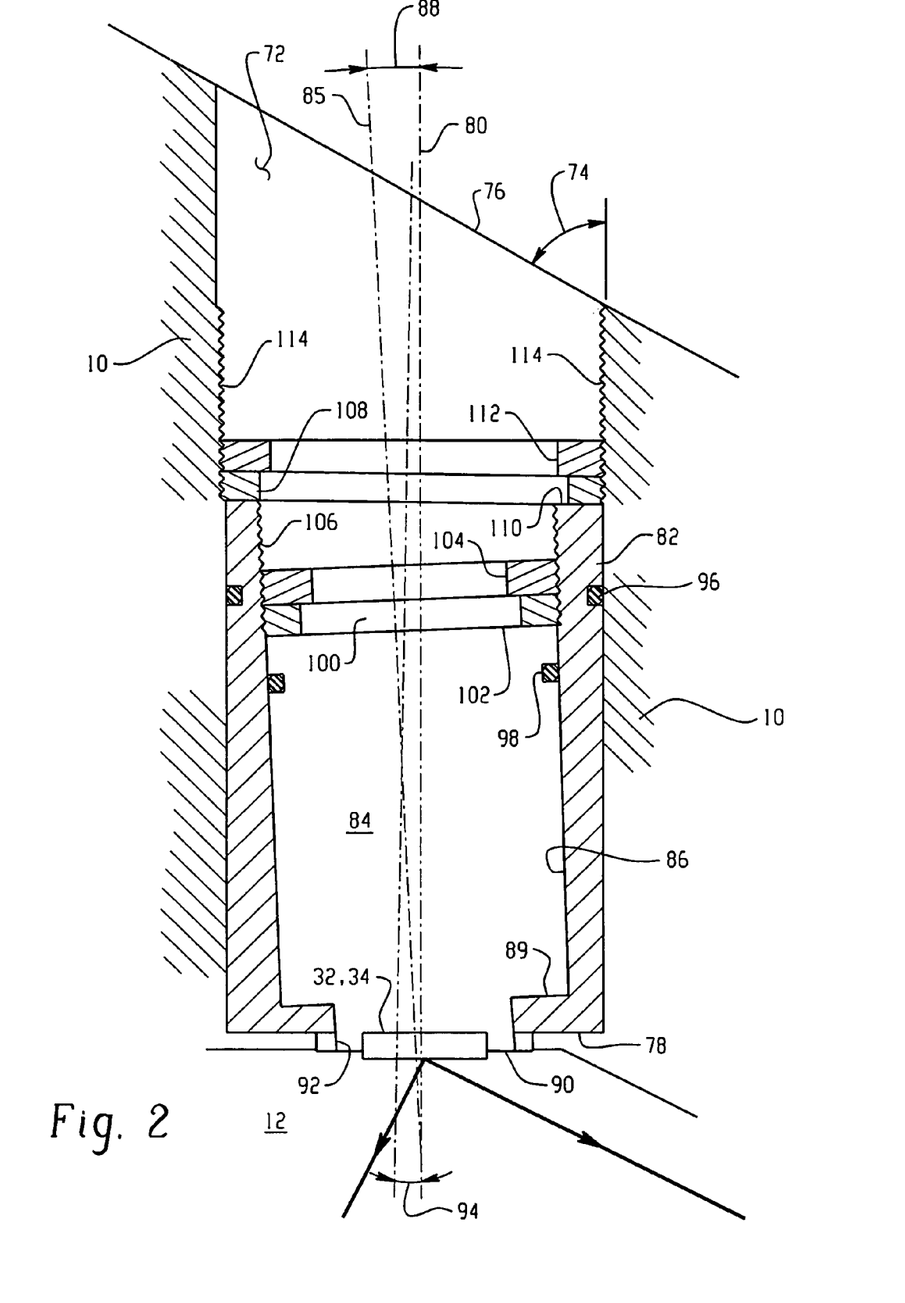
FIG. 2 is a cross-sectional illustration of fixedly adjustable mirror apparatus suitable for use in the laser altimeter embodiment of FIGS. 1A and 1B.

As noted above, a fixedly adjustable mirror apparatus is disposed in the cavity 12 for either the fold mirror 32 or fold mirror 34, preferably mirror 32. An exemplary embodiment of such a mirror apparatus is shown in the cross-sectional illustration of FIG. 2. Referring to FIG. 2, a cylindrical cavity 72 is machined or cut out from a wall of the housing 10 at an inclined angle 74 to the housing outside surface 76. The angle 74 is roughly commensurate with the intended inclination angle of the fold mirror 32, 34, for example. The cavity 72 extends into the housing wall 10 to a surface 78 which includes an opening to the cavity 12. An axis of the cylindrical cavity is illustrated by the line 80. An outer cylindrical section 82 is rotatably disposed into the cylindrical cavity 72. The section 82 preferably has a diameter commensurate with the diameter of the cavity 72 for smooth slip fitting therein and is seated on the surface 78 of the housing 10.

An inner cylindrical section 84 is rotatably disposed into a cylindrical cavity 86 of the outer section 82. The cylindrical cavity 86 may be cut or machined from the outer section 82 so as to have an axis 85 at a predetermined angle 88, which may be on the order of two degrees (2°), for example, from the axis 80 of the cylindrical cavity 72. The section 84 preferably has a diameter commensurate with the diameter of the cavity 86 for smooth slip fitting therein and is seated on a surface 89 at the bottom of the cavity 86. Moreover, the mirror element 32 or 34 may be disposed on a surface 90 of the inner section 84 such that the plane of the mirror 32,34 is at an angle 94 to the axis 80 of the cavity 72. (The dot-dashed line represents an axis normal to the plane of mirror element 32,24.) Preferably, the angle 94 is commensurate with the angle 88. An opening 92 to cavity 12 is provided at the bottom of cavities 72 and 86 to permit the surface 90 of inner section 84 to extend out from the outer section 82 and housing wall 10 into the cavity 12. A small cavity may be provided in the surface 90 for holding the angled mirror element which may be secured in place by an adhesive, such as epoxy glue, for example. In this configuration, the mirror element 32, 34 may reflect the pulsed laser beams (darkened arrowed lines) at an adjustable angle of reflection.

Each of the inner section 84 and outer section 82 may be rotated about its respective axis of rotation 85 and 80 within its cavity 86 and 72, respectively. The inner section 84 and outer section 82 are oriented in their nested configuration with different rotation axes 85 and 80 with respect to each other and also, different with respect to the axis normal to the mirror element 32,34. Thus, a rotation of either section 82 or 84 or both sections 82 and 84 will cause the mirror element 32, 34 to wobble about the axis 80 of cavity 72, and thus, adjust the angle of reflection. The amount of adjustment of the angle of reflection is commensurate with twice the angle difference 88 between the rotation axes of sections 82 and 84, which may be on the order of two degrees (2°), for example. Making angle 94 substantially equal to angle 88 enables the adjustment range of the mirror element to vary from zero to two times the angle 88 in any direction of rotation from the axis 80.

The mirror apparatus of FIG. 2 may be assembled as follows. Preferably, the mirror section 32, 34 may be secured at the predetermined angle 94 to surface 90 of the inner section 84 which is then slid into cavity 86 of the outer section 82 and seated on the surface 89 permitting the surface 90 and mirror element to protrude through opening 92. At least one "O" ring may be disposed around the periphery of the inner section 84 as shown at 98, for example, for providing an air tight seal between the inner and outer sections 84 and 82, respectively. Thereafter, a wavy spring washer 100 having a diameter commensurate with the diameter of the cavity 86 may be disposed on a top surface 102 of section 84 and a clamp ring 104 may be threaded into a threaded portion 106 (shown by darkened lines) of the inner wall of cavity 86 above the surface 102 of the section 84. The clamp ring 104 may be threadably tightened down on the wavy washer 100 and surface 102 to the extent that the wavy washer 100 is partially flattened to provide a slight tension to hold the inner section 84 in place within the cavity 86, but not so tight as to prevent rotation of the inner section 84 in the cavity 86.

Thereafter, the outer section assembly may be slid into cavity 72 and seated on the surface 78 permitting the surface 90 and mirror element to protrude through the bottom of cavity 72 and the housing 10 at the predetermined angle of inclination. At least one "O" ring may be disposed around the periphery of the outer section 82 as shown at 96, for example, for providing an air tight seal between the outer section 82 and the inner wall of cavity 72. Another wavy spring washer 108 having a diameter commensurate with the diameter of the cavity 72 may be disposed on a top surface 110 of section 82 and another clamp ring 112 may be threaded into a threaded portion 114 (shown by darkened lines) of the inner wall of cavity 72 above the surface 110 of the section 82. Accordingly, the clamp ring 112 may be threadably tightened down on the wavy washer 108 and surface 110 to the extent that the wavy washer 108 is partially flattened to provide a slight tension to hold the outer section 82 in place within the cavity 72, but not so tight as to prevent rotation of the outer section 82 in the cavity 72. Both of the washers 100 and 108 may be comprised of a spring steel, for example.

Note that the all of first optical elements may be rigidly mounted in the cavity 12 without precise alignment and any alignment errors may be compensated for by adjustment of the mirror apparatus. So, once the mirror apparatus and other first optical elements are fixedly disposed in cavity 12 at their proper positions as shown by the exemplary illustration of FIGS. 1A and 1B, the only adjustment available is by the rotation of the inner and outer sections 84 and 82, respectively, of the mirror apparatus. In this state, a rotation of either section 82 or 84 about its respective axis 80 or 85, or both sections 82 and 84 about their respective axes 80 and 85 will adjust the mirror element 32,34 to a desired angle of reflection which directs the second optical path 26, and thus, the emitted pulsed laser beams, within the field of view 48 of the telescope. Preferably, the adjustment of the mirror apparatus directs the second optical path substantially centered within the field of view 48 of the telescope.

Referring back to FIG. 2, once the mirror element is at the desired angle of reflection, both of the sections 82 and 84 of the mirror apparatus may be locked in place. For example, the outer section 82 is lockable in place by tightening the clamping ring 112 against the wavy spring washer 108 and surface 110 to the extent that the washer 108 is substantially flattened and the section 82 is unable to move. Similarly, the inner section 84 is lockable in place by tightening the clamping ring 104 against the wavy spring washer 100 and surface 102 to the extent that the washer 100 is substantially flattened and the section 84 is unable to move. The clamping rings 112 and 104 and respective wavy springs 108 and 100 will lock and retain the sections 82 and 84 in their adjusted positions which should not deviate substantially through the vibration, shock and temperature conditions of aircraft flight.

Figure 3A:
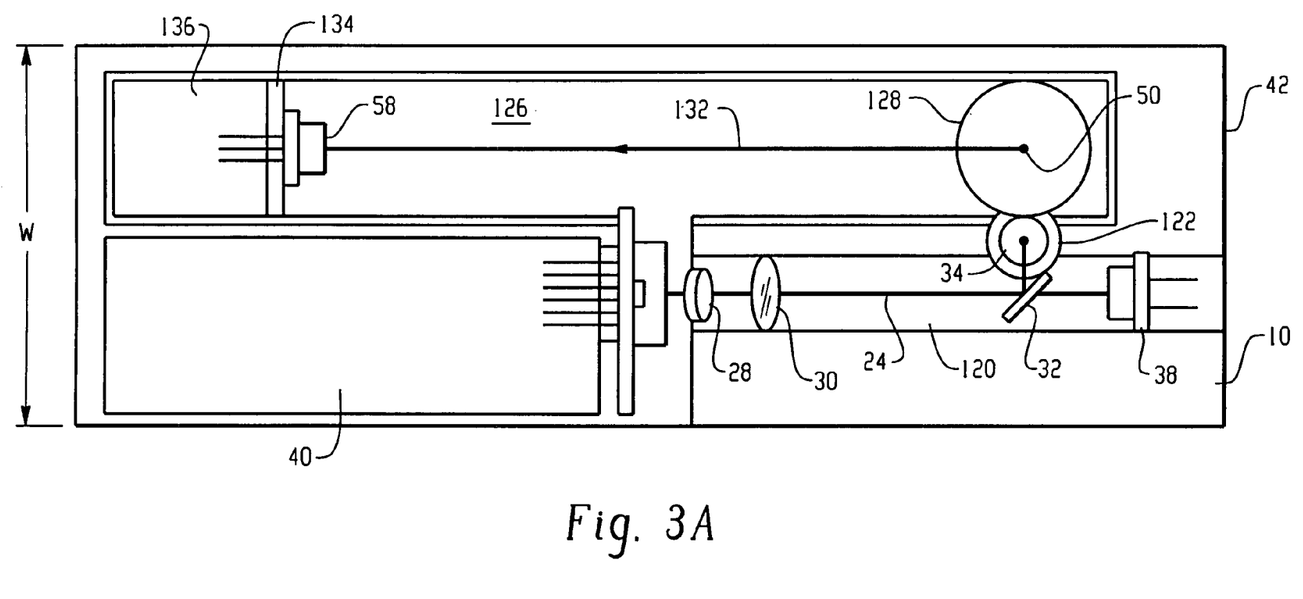
FIGS. 3A and 3B are cross-sectional top and side view illustrations, respectively, of an alternate embodiment of the present invention.
Figure 3B:
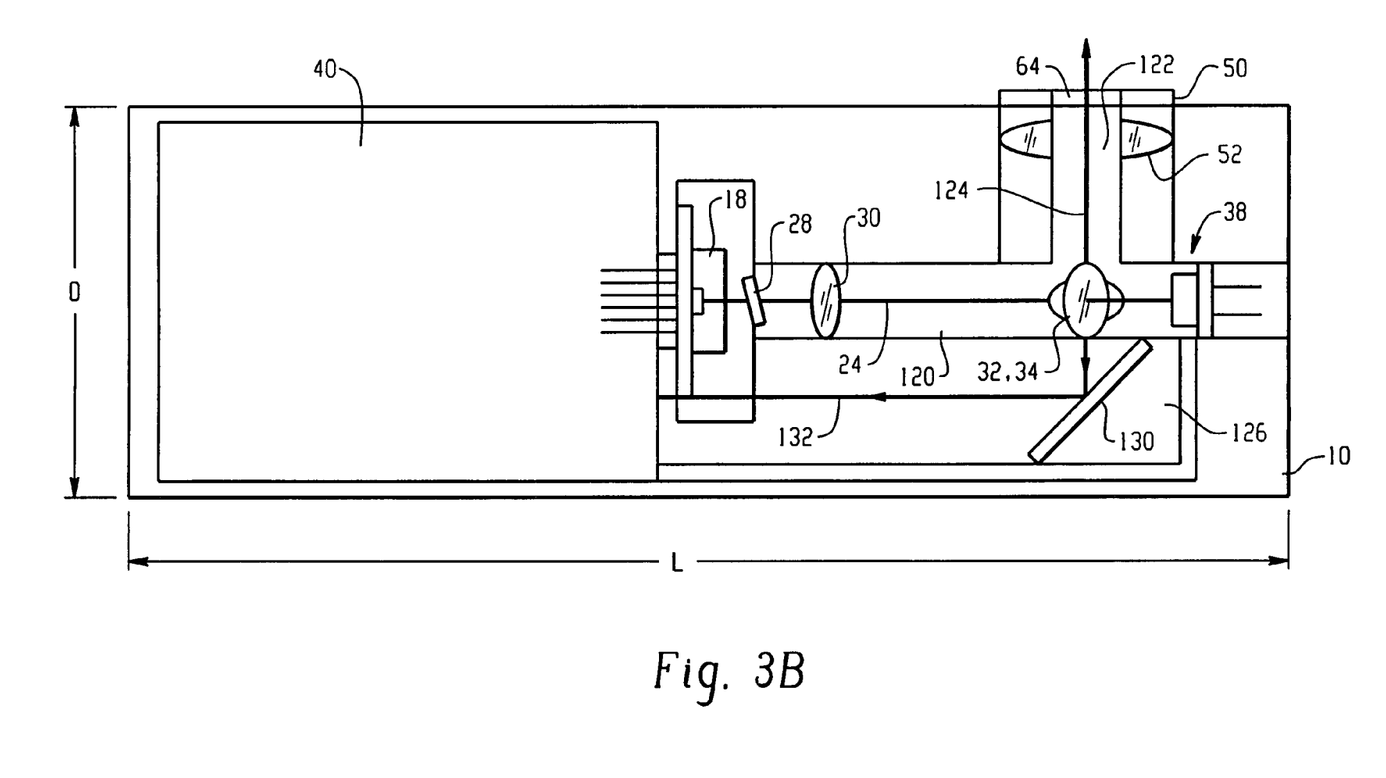

FIGS. 3A and 3B illustrate an alternate embodiment of the present invention in which the exit aperture of the transmitting housing and entrance aperture of the telescope housing are disposed at a side of the laser altimeter instead of the front as shown in FIGS. 1A and 1B. FIG. 3A is a cross-sectional top view of the side in which the exit and entrance apertures are disposed and FIG. 3B is a cross-sectional side view of the alternate embodiment. Like reference numerals will be used to describe components of the alternate embodiment which are the same or similar to those described for the embodiment of FIGS. 1A and 1B.

Referring to FIGS. 3A and 3B, the housing 10 includes a different configured cavity 120 which permits the laser beams to be directed to a side exit aperture 122 which may be sealed by the window pane 64. The laser source 18, the band pass filter element 28, and collimating lens 30 are fixedly supported within the cavity 120 to direct the laser beams along the optical path 24 much the same as described in connection with the embodiment of FIGS. 1A and 1B. However, the combination of fold mirrors 32 and 34 are configured differently to direct the optical path 24 to another optical path 124 which exits the housing 10 through the side exit aperture 122. Also, the light detector 38 is similarly configured in the cavity 122 behind the fold mirror 32 to detect as a trigger pulse light passed by the fold mirror 32. Either the fold mirror 32 or fold mirror 34 may be the adjustable mirror apparatus as described supra.

The second housing 42 includes a different hollow cavity 126 which forms an entrance aperture 128 disposed on the same side as the exit aperture 122 and in close proximity thereto. The band pass filter optical element 50 is disposed at the entrance aperture 128 and acts as a window seal. In this alternate embodiment, the focusing lens element 52 directs the laser beam reflections from the entrance aperture 128 to a fold mirror 130 fixedly supported within cavity 126 to reflect and direct the pulsed laser beam reflections along an optical path 132 in cavity 126 to the light detector 58 which may be adjustably mounted on a plate 134. The detector 58 may be slid along plate 134 to a desired position and fixedly mounted in place at that desired position. Behind plate 134 in the cavity 126 at 136 may be disposed the signal conditioning electronics for the light detector 58. The detector electronics at 136 may be coupled to the processing electronics in the cavity 40 through an aperture (not shown) through the adjacent walls of the housings 10 and 42.

The operation of the alternate laser altimeter embodiment of FIGS. 3A and 3B will be much the same as described for the embodiment of FIGS. 1A and 1B except that the laser beams are directed out from the side exit aperture 122 into the field of view of the telescope of housing 42 and laser beam reflections from objects are received into the side entrance aperture 128 and focused and directed in cavity 126 to the light detector 58 for electronic processing thereof. In addition, the alternate embodiment as shown in FIGS. 3A and 3B provides for overall exemplary dimensions in length L, width W and depth D of approximately 7.5 inches or 19 cm, 2.5 inches or 6.25 cm, and 2.5 inches or 6.25 cm, respectively.

Figure 4:
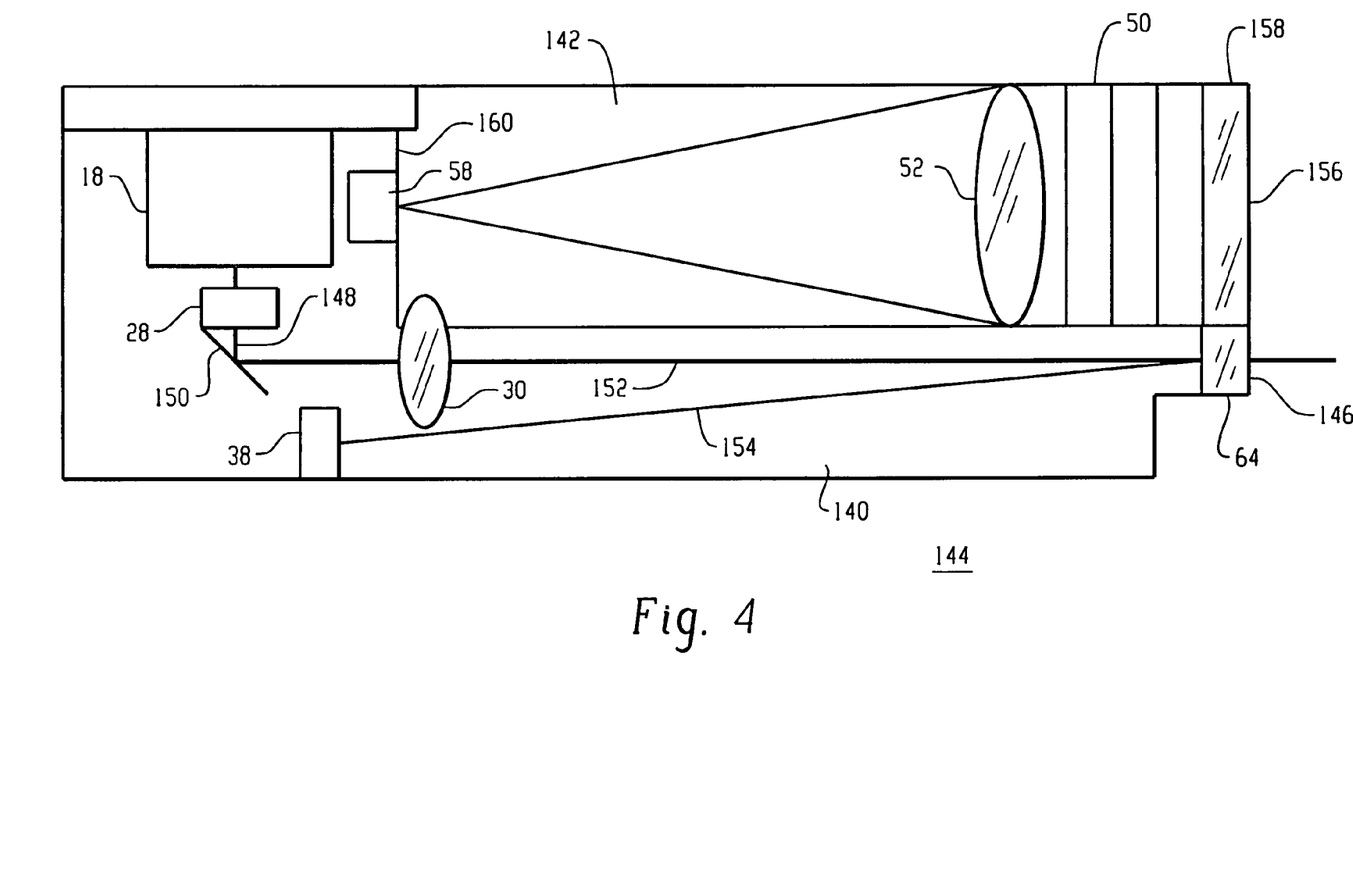
FIG. 4 is a cross-sectional side view illustration of another embodiment of the present invention.

FIG. 4 illustrates a cross-sectional side view of another embodiment of the present invention in which the "Z" configuration of cavity 12 as shown in FIG. 1B at 36 is removed. In this embodiment, a transmitting cavity 140 is wrapped about a telescope cavity 142 in an "L" shape within a common housing 144. At one end 146 of the cavity 140 is an exit aperture which may be on the order of 15 mm in diameter, for example. At the other end of cavity 140 is the laser source 18 which may be fixedly mounted to a wall of the housing 144 to direct the laser beams over an optical path 148 to a fold mirror element 150 disposed at the corner of the "L" cavity. The fold mirror element 150 reflects and directs the optical path 148 to another optical path 152 which passes the laser beams through the window 64 which may be made of fused silica, for example, and out the exit aperture 146. Some of the laser light may be reflected from the fused silica window 64 over optical path 154 to the trigger light detector 38 which is disposed in the cavity 140. The fold mirror 150 may be the fixedly adjustable optical apparatus as described herein above.

In this alternate embodiment, the band pass filter optical element 28 may be disposed along path 148 between the laser source 18 and fold mirror 150 and the collimating lens 30 which may have a focal length of 25 mm, for example, is disposed along path 152 in proximity to the fold mirror 150. Accordingly, the laser beams are directed from the fold mirror 150 in a direct path 152 to and out the exit aperture 146 without the use of the dual fold mirror configuration as described herein above in connection with the previous embodiments.

The telescope cavity 142 of this alternate embodiment includes an entrance aperture at one end 156 thereof. At the entrance aperture which may be approximately 25 mm in diameter, for example, is a window 158 for sealing the cavity 142. Also, disposed within the cavity 142 at the end 156 are the filter optical element 50 and lens 52 which may have a focal length of 150 mm, for example. The light detector 58 may be mounted to a wall of the housing at the other end 160 of the cavity 142 and adjusted in position to received the focused light from the lens 52. Thus, this alternate embodiment may have an exemplary length dimension on the order of 190 mm and an exemplary width dimension on the order of 40 mm.

Figure 5:
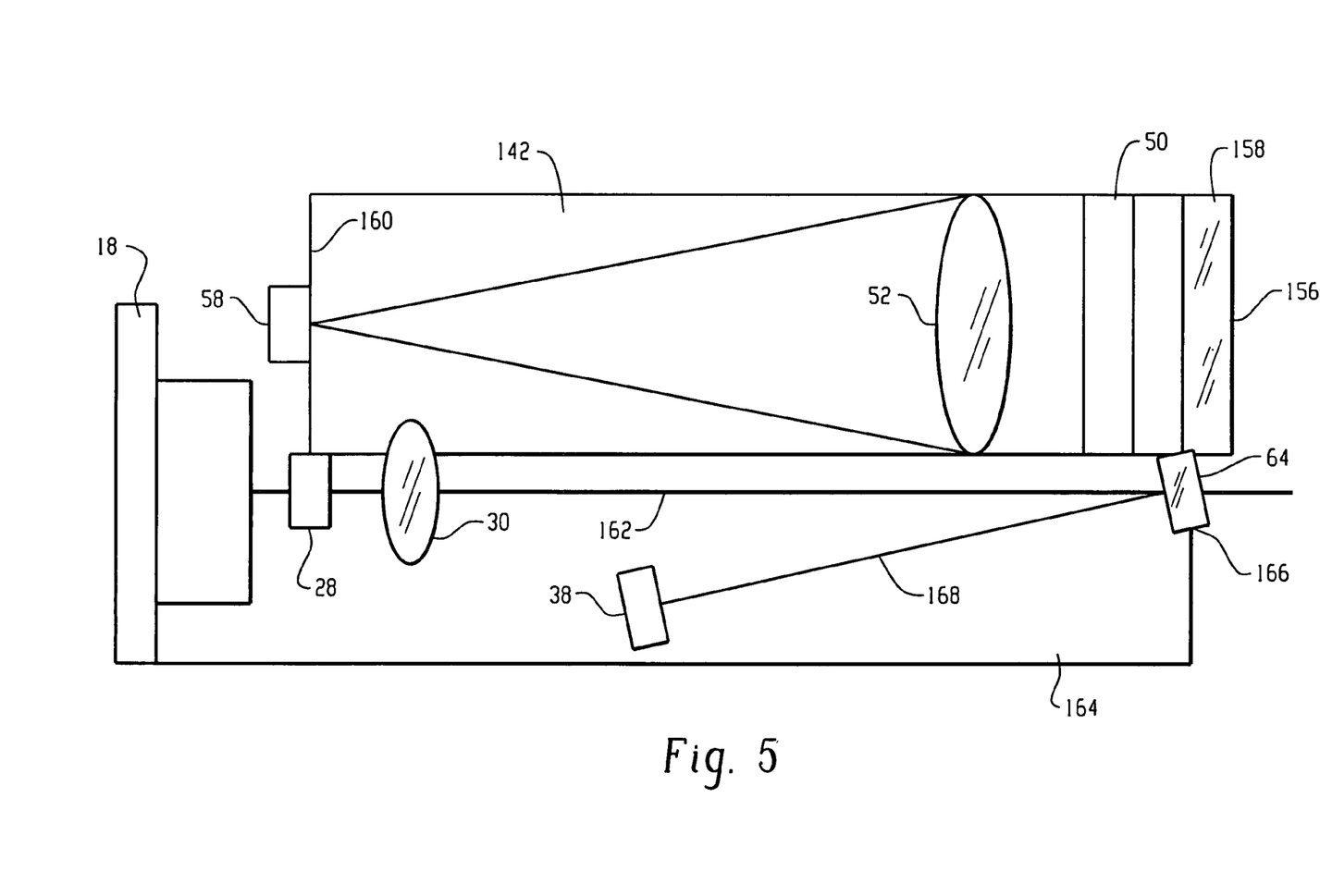
FIG. 5 is a cross-sectional side view illustration of yet another embodiment of the present invention.

FIG. 5 is a cross-sectional view illustration of yet another embodiment of the present invention in which the fold mirrors are eliminated from the design. In this embodiment, laser beams emitted from the laser source 18 are directed along a single, straight optical path 162 within a cavity 164 to and out an exit aperture 166 at the opposite end of the cavity. The filter and collimating lens optical elements, 28 and 30, respectively, are disposed along the path 162 in proximity to the laser source 18. The trigger light detector 38 may be disposed within the cavity 162 at a position to receive reflected laser light from the window 64 over path 168. The optical elements of the telescope cavity may be configured the same or similar to that described for the embodiment of FIG. 4.

Note that there is no adjustable optical apparatus in the transmitting cavity 164 to align the laser beam to a desired location within the field of view of the telescope. To compensate for this lack of alignment adjustment of the laser beams, the cavities 164 and 142 are fixedly aligned with respect to each to permit the optical path of laser beams 162 to fall within the field of view of the telescope. In addition, the light detector 58 of the telescope is adjustably mounted either on a plate such as described for the embodiment of FIG. 3A or to the wall of the housing as described for the embodiment of FIG. 4. Accordingly, the light detector 58 may be slid along the wall or plate to a position which permits a strong reception of the focused reflections of the laser beams from the field of view of the telescope. Once adjusted to the desired position, the light detector 58 is secured in place by screwing or bolting, for example. By eliminating the fold mirrors of the previously described embodiments, this embodiment provides for an even more compact and durable configuration of the optical elements of the laser altimeter, i.e. the light detector 58 is the only fixedly adjustable element. All of the other elements of the laser altimeter are secured in place within their respective cavities during assembly.

The housings of the foregoing described embodiments may comprise any light weight material, like Aluminum, a metal composite, or even an industrial plastic, for example. If Aluminum is used for the housing, the outer section 82 of the fixedly adjustable mirror apparatus may comprise a brass material, and the inner section 84 may comprise aluminum also, to prevent binding and galling of similar materials rotating against one another. While the aforementioned materials are suitable for the various embodiments, it is understood that there are many other light weight materials that may be also suitable for use therein. It is not the materials that are the more salient aspects of the various embodiment. Rather, the compactness of the optical elements which may be rigidly mounted without precision alignment, the ruggedness of the optical elements due to the reduction to only one adjustable optical component which is lockable in place after final adjustment, and the elimination of any back scattering of pulsed laser beams into the telescope render the present embodiment distinguishable from current laser altimeter designs.

While the present invention has been described herein above in connection with various embodiments, it is understood that such embodiments were presented merely by way of example and there was no intention to limit the present invention in any way, shape or form by such descriptions. Rather, the present invention should be construed in breadth and broad scope in accordance with the recitation of the claims appended hereto.

What is claimed is:

1. A laser-based altimeter for use on-board an aircraft, said altimeter comprising:

a first housing including a hollow cavity and an exit aperture;

a laser source and a plurality of first optical elements fixedly supported in a compact configuration within said hollow cavity of the first housing, said laser source for generating pulsed laser beams over a first optical path, and said plurality of first optical elements for directing said laser beams from said first optical path to a second optical path which exits said first housing through said exit aperture thereof;

a second housing including a hollow cavity and an entrance aperture;

at least one second optical element configured within said hollow cavity of the second housing to form a telescope with a predetermined field of view, said telescope for receiving at said entrance aperture reflections of said pulsed laser beams from objects within the field of view thereof and focusing said received reflections substantially to a focal point;

a light detector for receiving and converting said focused reflections into electrical signals representative thereof;

said first and second housings fixedly secured in alignment with respect to each other to permit said second optical path of the pulsed laser beams to be adjusted within said field of view of the telescope; and wherein only one first optical element of said plurality being fixedly adjustable for directing said second optical path within said field of view of the telescope.

2. The laser altimeter of claim 1 wherein the laser source comprises a microchip laser.

3. The laser altimeter of claim 1 wherein the laser source is operative to generate pulsed laser beams at a predetermined wavelength.

4. The laser altimeter of claim 3 wherein the plurality of first optical elements comprises a band pass filter optical element disposed in proximity to the laser source along the first optical path for blocking substantially wavelengths of light outside of a predetermined bandwidth around the predetermined wavelength from entering the hollow cavity of the first housing.

5. The laser altimeter of claim 4 wherein the plurality of first optical elements comprises a collimating lens disposed along the first optical path downstream of the band pass filter optical element for collimating the pulsed laser beams along the first optical path.

6. The laser altimeter of claim 3 wherein the at least one second optical elements comprises a band pass filter optical element disposed at the entrance aperture of the telescope for passing received wavelengths of light solely within a predetermined bandwidth around the predetermined wavelength of the pulsed laser beams.

7. The laser altimeter of claim 1 wherein the adjustable one first optical element comprises a fixedly adjustable mirror apparatus.

8. The laser altimeter of claim 7 wherein the mirror apparatus comprises:
an outer cylindrical section rotatably disposed within the first housing;
an inner cylindrical section rotatably disposed within said outer section;
a mirror element disposed on a surface of said inner section which extends from the outer section and first housing into the hollow cavity of the first housing, said mirror element for reflecting the pulsed laser beams at an adjustable angle of reflection;
said inner and outer sections being configured with different rotation axes with respect to each other;
said angle of reflection of said mirror element being adjustable to a desired angle of reflection by the rotation of at least one of said inner and outer sections about the respective rotation axis thereof; and
said inner and outer sections being lockable in place at the desired angle of reflection.

9. The laser altimeter of claim 8 wherein the desired angle of reflection of the mirror element directs the second optical path within the field of view of the telescope.

10. The laser altimeter of claim 8 wherein the desired angle of reflection of the mirror element directs the second optical path substantially centered within the field of view of the telescope.

11. The laser altimeter of claim 8 wherein the angle of reflection of the mirror element is adjustable to the desired angle of reflection by the rotation of both of the inner and outer sections about their respective rotation axes.

12. The laser altimeter of claim 1 wherein the at least one second optical element comprises a convex lens fixedly disposed in proximity to the entrance aperture, said convex lens having a predetermined focal length for focusing the received reflections to the focal point of the telescope.

13. The laser altimeter of claim 12 wherein the predetermined focal length of the convex lens is within the hollow cavity of the second housing.

14. The laser altimeter of claim 12 wherein the at least one second optical element comprises a fold mirror disposed within the hollow cavity for directing the focused received reflections to the light detector.

15. The laser altimeter of claim 1 including a window pane disposed at the exit aperture for sealing the cavity of the first housing from the outside environment.

16. The laser altimeter of claim 1 wherein the first and second housings are fixedly secured together along walls of their respective cavities to align the exit and entrance apertures respectively thereof in proximity to each other.

17. The laser altimeter of claim 16 wherein the exit aperture of the first housing is offset back of the entrance aperture of the second housing.

18. The laser altimeter of claim 16 including a window pane disposed at the exit aperture for sealing the cavity of the first housing from the outside environment, said window pane being tilted with respect to the exit aperture.

19. The laser altimeter of claim 16 wherein the first housing includes another hollow cavity for containing processing electronics; wherein the first housing includes a first opening in a wall of said another hollow cavity thereof and the second housing includes a second opening in a wall of the hollow cavity thereof, said first and second openings being aligned; wherein the light detector is disposed at said another cavity and coupled to the processing electronics; and wherein the at least one second optical element comprises a fold mirror disposed within the hollow cavity for directing the focused received reflections to the first and second openings and the light detector.

20. The laser altimeter of claim 19 wherein the light detector is disposed within the aligned first and second openings between the first and second housings.

21. The laser altimeter of claim 1 including a front; and wherein the exit and entrance apertures are disposed at the front of the laser altimeter.

22. The laser altimeter of claim 1 including a side; and wherein the exit and entrance apertures are disposed at the side of the laser altimeter.

23. A laser-based altimeter for use on-board an aircraft, said altimeter comprising:
a housing including a first hollow cavity and an exit aperture thereof, and a second hollow cavity and an entrance aperture thereof;
a laser source and a plurality of first optical elements fixedly supported in a compact configuration within said first hollow cavity, said laser source for generating pulsed laser beams over a first optical path and said plurality of first optical elements for directing said laser beams from said first optical path to a second optical path which exits said first cavity through said exit aperture thereof;
at least one second optical element configured within said second hollow cavity to form a telescope with a predetermined field of view, said telescope for receiving at said entrance aperture reflections of said pulsed laser beams from objects with the field of view thereof and focusing said received reflections substantially to a focal point;
a light detector for receiving and converting said focused reflections into electrical signals representative thereof;
said first and second hollow cavities in alignment with respect to each other to permit said second optical path of the pulsed laser beams to be adjusted within said field of view of the telescope; and
wherein only one first optical element of said plurality being fixedly adjustable for directing said second optical path within said field of view of the telescope.

* * * * *